(12) United States Patent
Jang et al.

(10) Patent No.: US 11,044,201 B2
(45) Date of Patent: Jun. 22, 2021

(54) TRAFFIC CONTROL METHOD AND ELECTRONIC DEVICE THEREOF

(71) Applicant: Samsung Electronics Co., Ltd., Gyeonggi-do (KR)

(72) Inventors: Jaewon Jang, Gyeonggi-do (KR); Sung-In Kim, Seoul (KR); Hakgyu Kim, Gyeonggi-do (KR); Hong-Shik Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/500,880

(22) PCT Filed: Apr. 5, 2018

(86) PCT No.: PCT/KR2018/004025
§ 371 (c)(1),
(2) Date: Oct. 4, 2019

(87) PCT Pub. No.: WO2018/186699
PCT Pub. Date: Oct. 11, 2018

(65) Prior Publication Data
US 2020/0036643 A1 Jan. 30, 2020

(30) Foreign Application Priority Data
Apr. 7, 2017 (KR) .......................... 10-2017-0045523

(51) Int. Cl.
*H04L 12/859* (2013.01)
*G01K 7/22* (2006.01)
(Continued)

(52) U.S. Cl.
CPC ............ *H04L 47/2475* (2013.01); *G01K 7/22* (2013.01); *G01K 13/00* (2013.01); *G06F 9/44* (2013.01);
(Continued)

(58) Field of Classification Search
CPC ........ G06F 1/206; G06F 1/203; G06F 1/3296; G06F 11/3058; G06F 1/324;
(Continued)

(56) References Cited

U.S. PATENT DOCUMENTS

| 6,087,949 A * | 7/2000 | Yanagida ............... H04B 1/036 340/586 |
| 6,169,884 B1 * | 1/2001 | Funk ..................... H04B 1/036 455/522 |

(Continued)

FOREIGN PATENT DOCUMENTS

| CN | 1801669 A * | 7/2006 | ........ H04W 52/0277 |
| CN | 101951642 A * | 1/2011 | ............ H04W 8/245 |

(Continued)

OTHER PUBLICATIONS

Kurihara et al., Estimation of Power Consumption of Each Application Caused by Device Lock Considering Software Dependency in Smartphones, Nov. 2017, Electronic ISSN: 2379-1896 (Year: 2017).*

(Continued)

*Primary Examiner* — Matthew C Sams
(74) *Attorney, Agent, or Firm* — Cha & Reiter, LLC.

(57) ABSTRACT

The present invention generally relates to a method for traffic control, and an electronic device therefor. An operation method of an electronic device may comprise the steps of: measuring the temperature of the electronic device through at least one sensor; checking an operation state of at least one application being executed in the electronic device; and controlling data throughput for each of the at least one application on the basis of the operation state of the at least one application if the measured temperature is equal to or greater than a reference value. Other various embodiments are possible.

14 Claims, 10 Drawing Sheets

(51) Int. Cl.
  *G01K 13/00* (2021.01)
  *G06F 9/44* (2018.01)
  *H04L 12/26* (2006.01)
  *H04W 28/02* (2009.01)
  *H04M 1/72403* (2021.01)

(52) U.S. Cl.
  CPC ........ *H04L 43/16* (2013.01); *H04M 1/72403* (2021.01); *H04W 28/0215* (2013.01); *H04M 2250/12* (2013.01)

(58) Field of Classification Search
  CPC ...... G06F 1/1626; G06F 1/163; G06F 1/1698; G06F 1/26; G06F 1/3203; G06F 1/3206; G06F 1/3287; G06F 11/3031; G06F 11/3037; G06F 11/3072; H04B 1/036; H04W 52/0251; H04W 52/36; H04W 24/02; H04W 52/0264; H04W 52/028; H04W 24/04; H04W 8/22; H04W 52/0219; H04W 52/0261; H04W 52/0277; H04W 52/367; H04W 48/18; H04W 52/0216; H04W 52/18; H04W 52/223; H04W 52/226; H04W 52/267; H04W 88/04; H04W 88/08; H04W 92/18; H04M 2250/12
  See application file for complete search history.

(56) References Cited

U.S. PATENT DOCUMENTS

| | | | | |
|---|---|---|---|---|
| 6,574,209 | B1 * | 6/2003 | Kosaka | H03G 3/3036 370/342 |
| 6,647,320 | B1 | 11/2003 | Inoue | |
| 7,206,567 | B2 * | 4/2007 | Jin | H04M 1/677 455/404.1 |
| 7,610,496 | B2 | 10/2009 | Kiim | |
| 7,689,256 | B2 * | 3/2010 | Jin | H04W 4/90 455/574 |
| 7,747,272 | B2 * | 6/2010 | Parsa | H04M 1/0293 455/115.1 |
| 8,494,512 | B2 * | 7/2013 | Matsumura | H04W 76/14 455/423 |
| 9,667,280 | B2 * | 5/2017 | Shahidi | H04B 1/036 |
| 10,503,233 | B2 * | 12/2019 | Wang | G06F 15/76 |
| 10,785,676 | B2 * | 9/2020 | Yu | H04W 72/10 |
| 2008/0004067 | A1 | 1/2008 | Piipponen et al. | |
| 2008/0108331 | A1 * | 5/2008 | Jin | H04W 4/90 455/414.1 |
| 2008/0194215 | A1 * | 8/2008 | Bolanos | H04W 52/223 455/115.1 |
| 2010/0330950 | A1 * | 12/2010 | Wells | H04B 1/3883 455/404.1 |
| 2012/0075992 | A1 * | 3/2012 | Shahidi | H04B 1/036 370/235 |
| 2012/0124196 | A1 * | 5/2012 | Brisebois | H04W 76/38 709/224 |
| 2013/0091348 | A1 | 4/2013 | Kwon et al. | |
| 2013/0191541 | A1 * | 7/2013 | Kishan | G06F 15/173 709/226 |
| 2014/0115366 | A1 | 4/2014 | Joo et al. | |
| 2015/0288792 | A1 * | 10/2015 | Nayak | H04M 1/675 455/558 |
| 2016/0224081 | A1 * | 8/2016 | Worthington | H04W 52/0258 |
| 2016/0252944 | A1 * | 9/2016 | Kim | G06F 11/3062 713/340 |
| 2016/0358537 | A1 | 12/2016 | Kang et al. | |
| 2017/0048801 | A1 | 2/2017 | Choi et al. | |
| 2017/0215022 | A1 * | 7/2017 | Chang | H04L 67/14 |
| 2018/0139645 | A1 * | 5/2018 | Yu | H04W 28/0268 |
| 2018/0299940 | A1 * | 10/2018 | Wang | G06F 15/76 |
| 2019/0187765 | A1 * | 6/2019 | Ashwood | G06F 1/206 |

FOREIGN PATENT DOCUMENTS

| | | | | |
|---|---|---|---|---|
| CN | 106371481 | A * | 2/2017 | ............. H04M 1/73 |
| CN | 107566624 | A * | 1/2018 | |
| EP | 3197129 | A1 * | 7/2017 | ......... H04L 43/0882 |
| KR | 10-2013-0038440 | A | 4/2013 | |
| KR | 10-2014-0050290 | A | 4/2014 | |
| KR | 10-2014-0051717 | A | 5/2014 | |
| KR | 10-2015-0121887 | A | 10/2015 | |
| KR | 10-2016-0142052 | A | 12/2016 | |
| WO | WO-2012034328 | A1 * | 3/2012 | ............ H04W 8/245 |

OTHER PUBLICATIONS

Korean Search Report dated Mar. 29, 2021.

* cited by examiner

TRAFFIC CONTROL METHOD AND ELECTRONIC DEVICE THEREOF

CROSS REFERENCE TO RELATED APPLICATIONS

This application is a National Phase Entry of PCT International Application No. PCT/KR2018/004025, which was filed on Apr. 5, 2018, and claims a priority to Korean Patent Application No. 10-2017-0045523, which was filed on Apr. 7, 2017, the contents of which are incorporated herein by reference.

TECHNICAL FIELD

The disclosure relates to a traffic control method and an electronic device for the same, and more particularly, to an apparatus and a method for controlling traffic when an electronic device is heated.

BACKGROUND ART

With the development of information and communication technologies and the popularization of the use of smart phones, services provided through smart phones have changed to user-oriented application-based services. Recently, open source-based smart phones have been popularized, and users of smart phones download various applications from open markets, install the applications in smart phones, and use the applications. In such an environment, the users may install applications which have not been verified, in which case smart phones may have problems in performance.

As described above, due to an abnormal operation of the non-verified application, a component within the smart phone may be excessively used. As a result, the smart phone may be continuously heated, and thus the convenience of the use thereof may be reduced, the performance of the smart phone may deteriorate, and an operation error may be caused. In severe cases, the smart phone may catch fire, which may lead to a serious situation to the user like physical or proprietary damage.

DISCLOSURE OF THE INVENTION

Technical Problem

An electronic device is required to reduce heat before a problem occurs due to the heat. In order to reduce the heat of the electronic device, a method of reducing a speed through clock control may be used. However, in this case, an operation speed of a chip that influences the clock may become slower. However, in a situation where it is required to intensively control an application causing a heat problem in particular, the clock control method may have little influence on the heat generation but may influence the performance of the operation of an application executed in a foreground (FG). Accordingly, the need of a method of controlling the operation for each application to reduce the heat has increased.

Based on the above discussion, various embodiments may provide an apparatus and a method for controlling traffic.

Various embodiments may provide an apparatus and a method for monitoring a temperature of the electronic device and controlling traffic according to the temperature of the electronic device.

Various embodiments may provide an apparatus and a method for determining a heat state of the electronic device and controlling data throughput for each application.

Various embodiments may provide an apparatus and a method for, when a temperature of the electronic device is higher than or equal to a specific value, controlling data throughput of each application, being executed, on the basis of a state of the application.

Various embodiments may provide an apparatus and a method for controlling data throughput of each application, being executed, on the basis of a data throughput control history for a heat condition of the electronic device.

Solution to Problem

In accordance with an aspect of the disclosure, a method of operating an electronic device is provided. The method includes: measuring a temperature of the electronic device through at least one sensor; identifying an operation state of at least one application being executed in the electronic device; and when the measured temperature is higher than or equal to a reference value, controlling data throughput for each of the at least one application based on the operation state of the at least one application.

In accordance with another aspect of the disclosure, an electronic device is provided. The electronic device includes: at least one sensor used to measure a temperature of the electronic device; and at least one processor configured to identify an operation state of at least one application being executed in the electronic device, and when the measured temperature is higher than or equal to a reference value, control data throughput for each of the at least one application based on the operation state of the at least one application.

Advantageous Effects of Invention

According to an electronic device and a method of operating the same according to various embodiments, it is possible to control the electronic device in consideration of an expected current consumption level according to a heat state by measuring a temperature of the electronic device. For example, when the heat state of the electronic device needs to be controlled such that the temperature is lowered by a predetermined level or higher, it is possible to control the heat state without influencing another application by identifying an operation state for each application and a data transmission/reception state and controlling data throughput for each application. According to various embodiments, it is possible to minimize inconvenience of the user by preferentially controlling an application executed in a background (BG) rather than one in a foreground (FG) and to rapidly remove the heat condition by preferentially controlling an application having a large heat factor in consideration of current consumption. Accordingly, it is possible to control the heat condition while minimizing influence on the performance of the electronic device according to various embodiments.

BEST MODE FOR CARRYING OUT THE INVENTION

Figure 1:
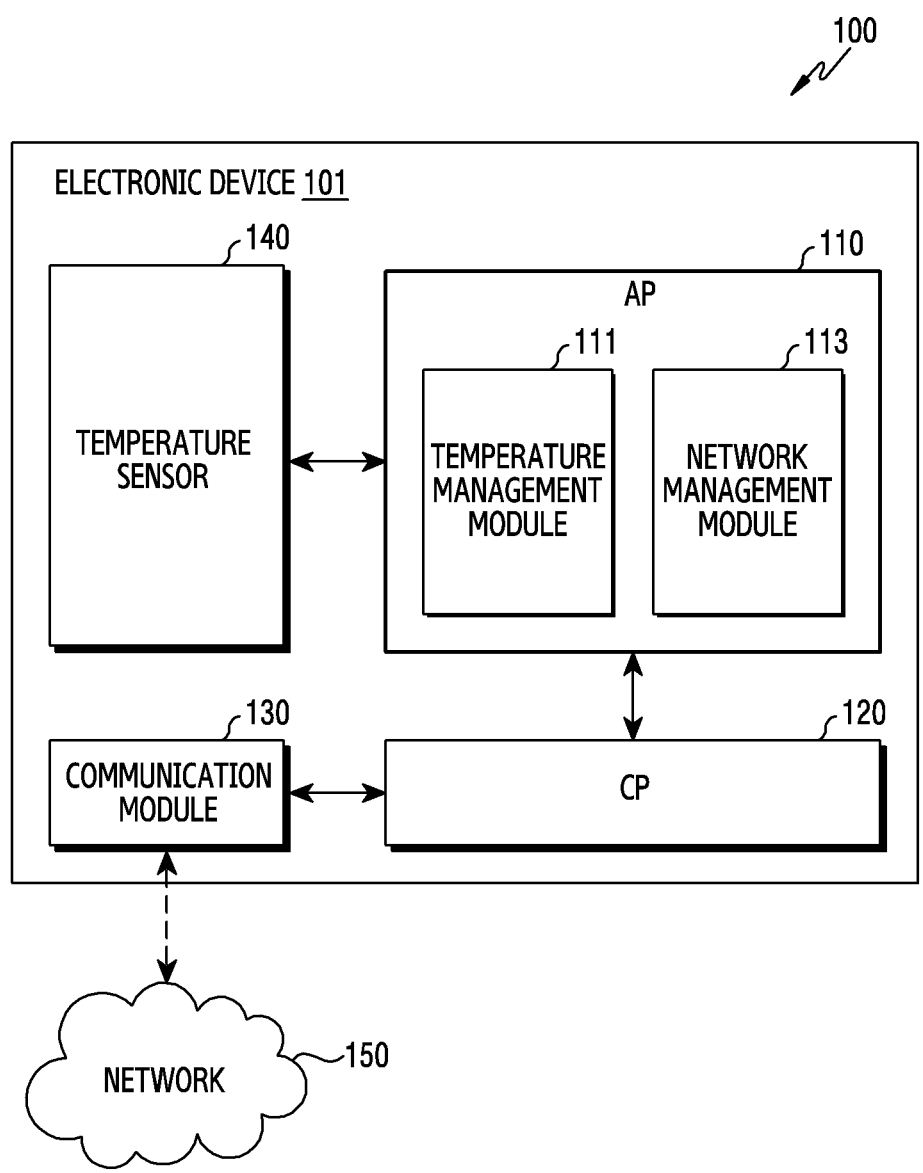
FIG. 1 illustrates a network environment including an electronic device according to various embodiments of the disclosure.

Hereinafter, various embodiments of the disclosure will be described with reference to the accompanying drawings. The embodiments and the terms used therein are not intended to limit the technology disclosed herein to specific implementation forms, and should be understood to include various modifications, equivalents, and/or alternatives to the corresponding embodiments. In describing the drawings, similar reference numerals may be used to designate similar elements.

A singular expression may include a plural expression unless they are definitely different in a context. As used herein, the expression "A or B" or "at least one of A and/or B" may include all possible combinations of items enumerated together. The expression "a first", "a second", "the first", or "the second" used in various embodiments of the disclosure may modify corresponding elements regardless of the order or the importance and is used to distinguish one element from another element but does not limit the corresponding elements When an element (for example, first element) is referred to as being "(functionally or communicatively) connected," or "coupled" to another element (second element), the element may be connected directly to the another element or connected to the another element through yet another element (for example, third element).

The expression "configured to" as used herein may be interchangeably used with, for example, "suitable for", "having the capacity to", "changed to", "made to", "capable of" or "designed to" in terms of hardware or software, according to circumstances. Alternatively, in some situations, the expression "device configured to" may mean that the device, together with other devices or elements, "is able to". For example, the phrase "processor adapted (or configured) to perform A, B, and C" may mean a dedicated processor (for example, embedded processor) for performing the corresponding operations or a generic-purpose processor (for example, Central Processing Unit (CPU) or Application Processor (AP)) for performing the corresponding operations by executing one or more software programs stored in a memory device.

An electronic device according to various embodiments of the disclosure may include, for example, at least one of a smart phone, a tablet Personal Computer (PC), a mobile phones, a video phone, an electronic book reader, a desktop PC, a laptop PC, a netbook computer, a workstation, a server, a Personal Digital Assistant (PDA), a Portable Multimedia Player (PMP), an MPEG-1 Audio Layer-3 (MP3) player, a medical device, a camera, or a wearable device. The wearable device may include at least one of an accessory type (for example, a watch, a ring, a bracelet, an anklet, a necklace, glasses, a contact lens, or a Head-Mounted Device (HMD)), a fabric or clothing-integrated type (for example, an electronic clothing), a body-mounted type (for example, a skin pad or tattoo), or a bio-implantable type circuit (for example, an implantable circuit).

In some embodiments, the electronic device may include, for example, at least one of a television, a Digital Video Disc (DVD) player, an audio system, a refrigerator, an air conditioner, a vacuum cleaner, an oven, a microwave oven, a washing machine, an air cleaner, a set-top box, a home automation control panel, a security control panel, a media box (for example, Samsung HomeSync™, Apple TV™, or Google TV™), a game console (for example, Xbox™ and PlayStation™), an electronic dictionary, an electronic key, a camcorder, or an electronic photo frame.

In other embodiments, the electronic device may include at least one of a navigation device, a Global Navigation Satellite System (GNSS), an Event Data Recorder (EDR), a Flight Data Recorder (FDR), an in-vehicle infotainment device, automotive infotainment device, electronic equipment for a ship (for example, navigation equipment for a ship or gyro compass), avionics, a security device, a head unit for a car, an industrial or home robot, a drone, an Automated Teller Machine (ATM) of a financial institution, a Point of Sales (POS) of a store, or an Internet of Things (IoT) device (for example, lightbulb, various sensors, sprinkler device, fire alarm, temperature controller, streetlamp, toaster, sporting goods, hot-water tank, heater, and boiler).

According to various embodiments, the electronic device may be flexible or a combination of two or more of the above-described various devices. The electronic devices according to embodiments of the disclosure are not limited to those described above. In the disclosure, the term "user" may indicate a person using an electronic device or a device (for example, an artificial intelligence electronic device) using an electronic device.

FIG. 1 illustrates a network environment including an electronic device according to various embodiments.

An electronic device 101 within a network environment 100 according to various embodiments will be described with reference to FIG. 1. The electronic device 101 may include an Application Processor (AP) 110, a Communication Processor (CP) 120, a communication module 130, and a temperature sensor 140. In some embodiments, the electronic device 101 may omit at least one of the elements or may further include other elements.

The AP 110 may include, for example, a temperature management module 111 and a network management module 113. According to an embodiment, the temperature management module 111 may include a temperature monitoring module 341, and the network management module 113 may include a traffic control module 331 and/or a policy module 333. The AP 110 may be an element included in the processor 210 of the electronic device 201.

According to an embodiment, the temperature management module 111 may measure a temperature value through at least one temperature sensor 140 disposed within the electronic device 101 according to a predetermined period. The temperature management module 111 may obtain a surface temperature of the electronic device on the basis of the measured temperature value and determine whether the obtained temperature of the electronic device 101 is higher than or equal to a specific reference value. For example, when the temperature of the electronic device 101 is higher than the specific reference value, the temperature management module 111 may make a request for controlling a data communication-related operation.

According to another embodiment, the temperature management module 111 may be an independent module for determining the temperature sensor 140 and a temperature sensor value in a separate Integrated Circuit (IC) outside the AP 110.

According to an embodiment, the network management module 113 may identify an application being executed and operation state information of the application. The network management module 113 may determine data throughput for each application on the basis of state information of an application being executed. For example, the network management module 113 may control data throughput of each application according to the determined data throughput for each application and resolve a heat problem of the electronic device therethrough. Further, the network management module 113 may manage, for example, a control level for each application and a data throughput policy according to the level. For example, the control level and the data throughput policy may be information preset and stored in the electronic device 101, and the management module 113 may change a policy according to a time point at which the electronic device 101 is used and/or location information. According to another embodiment, the network management module 113 may periodically receive policy information through an external server and update the same.

The CP 120 may control, for example, the communication module 130 to receive data transmitted from the network 150 and transmit data received from the AP 110 to the network 150.

The communication module 130 may establish, for example, communication between the electronic device 101 and an external device (for example, an external electronic device or a server). For example, the communication module 130 may be connected to the network 150 through wireless communication or wired communication and may communicate with the external device.

The wireless communication may include, for example, cellular communication using at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), or Global System for Mobile Communications (GSM).

According to an embodiment, the wireless communication may include, for example, at least one of Wireless Fidelity (Wi-Fi), Light Fidelity (Li-Fi), Wireless Gigabit (WiGig), Bluetooth, Bluetooth low Energy (BLE), ZigBee, Near Field Communication (NFC), magnetic secure transmission, Radio Frequency (RF), or Body Area Network (BAN).

According to an embodiment, the wireless communication may include a GNSS. The GNSS may be, for example, a Global Positioning System (GPS), a Global navigation satellite system (GLONASS), a BeiDou navigation satellite system (hereinafter, referred to as "BeiDou"), or Galileo (the European global satellite-based navigation system). Hereinafter, in this document, the "GPS" may be interchangeably used with the "GNSS".

The wired communication may include, for example, at least one of a Universal Serial Bus (USB), a High Definition Multimedia Interface (HDMI), Recommended Standard 232 (RS-232), power line communication, or a Plain Old Telephone Service (POTS).

For example, the communication module 130 may transmit and receive data to and from the network 150 under the control of the CP 120.

According to other embodiments, the CP 120 may be included in the configuration of the communication module 130. Further, the CP 120 and the communication module 130 may operate as a single block.

The temperature sensor 140 may be at least one thermistor circuit disposed within the electronic device 101 and may indicate a temperature value by a resistance value varying depending on temperature.

The network 150 may include a telecommunication network, for example, at least one of a computer network (for example, a Local Area Network (LAN) or a Wide Area Network (WAN)), Internet, or a telephone network.

Figure 2:
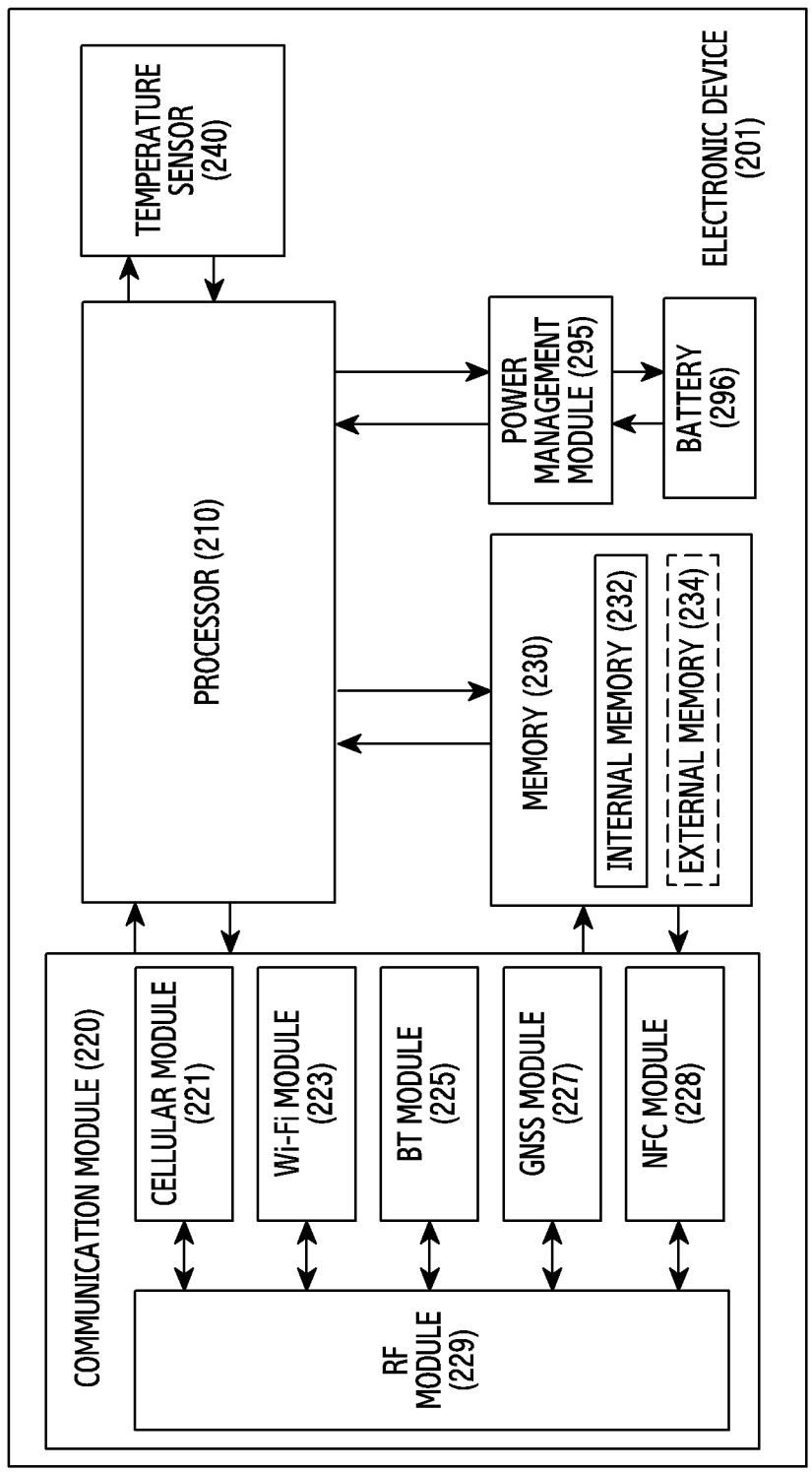
FIG. 2 is a block diagram of an electronic device according to various embodiments of the disclosure.

FIG. 2 is a block diagram of an electronic device according to various embodiments of the disclosure.

The electronic device 201 may include, for example, all or some of the electronic device 101 illustrated in FIG. 1. The electronic device 201 may include one or more processors 210 (for example, APs), a communication module 220, a memory 230, a temperature sensor 240, a power management module 295, and a battery 296.

According to various embodiments, since not all the elements illustrated in FIG. 2 are necessary, the electronic device 201 may have more or fewer elements that those illustrated in FIG. 2. For example, the electronic device 201 according to various embodiments may not include some elements depending on the type thereof. According to various embodiments, the elements of the electronic device 201 may be located on the housing (or the bezel or the body) of the electronic device 201, or may be formed outside the electronic device 201.

The processor 210 may drive, for example, an operating system or an application to control a plurality of hardware or software elements connected to the processor 210 and to perform various types of data processing and operations. The processor 210 may be implemented by, for example, a System on Chip (SoC). According to an embodiment, the processor 210 may further include a Graphic Processing Unit (GPU) and/or an Image Signal Processor (ISP).

The processor 210 may also include at least some of the elements illustrated in FIG. 2 (for example, a cellular module 221). The processor 210 may load, in volatile memory, instructions or data received from at least one of the other elements (for example, non-volatile memory), process the loaded instructions or data, and store the resultant data in the non-volatile memory.

According to various embodiments, the processor 210 may include one or more processors. For example, the processor 210 may include a Communication Processor (CP), an Application Processor (AP), an interface (for example, General-Purpose Input/Output: GPIO), or an internal memory, either as separate elements or integrated into one or more integrated circuits. According to an embodiment, the application processor may perform various functions for the electronic device 201 by executing several software programs, and the communication processor may perform processing and control for voice communication and data communication. The processor 210 may serve to execute a particular software module (for example, an instruction set) stored in the memory 230 and perform various particular functions corresponding to the module.

According to various embodiments, the processor 210 may control the overall operation of the electronic device 201. According to various embodiments, the processor 210 may control the operation of a hardware module such as the communication module 220, the power management module 295, or the temperature sensor 240. According to various embodiments, the processor 210 may be electrically connected to the memory 230 of the electronic device 201.

The processing (or controlling) operation of the processor 210 according to various embodiments is described in detail with reference to the following drawings.

The communication module 220 may have, for example, a configuration which is the same as or similar to the communication module 130 illustrated in FIG. 1. The communication module 220 may include, for example, a cellular module 221, a Wi-Fi module 223, a Bluetooth module 225, a GNSS module 227, an NFC module 228, and an RF module 229. Although not illustrated, the communication module 220 may further include, for example, a WiGig module (not shown). According to an embodiment, the Wi-Fi module 223 and the WiGig module (not shown) may be integratively implemented in the form of a single chip.

The cellular module 221 may provide, for example, a voice call, a video call, a text message service, an Internet service, etc. through a communication network. According to an embodiment, the cellular module 221 may identify and authenticate the electronic device 201 within the communication network using a subscriber identification module (for example, a Subscriber Identification Module (SIM) card) (not shown). According to an embodiment, the cellular module 221 may perform at least some of the functions that the processor 210 may provide. According to an embodiment, the cellular module 221 may include a communication processor (CP). According to some embodiments, at least some (for example, two or more) of the cellular module 221, the Wi-Fi module 223, the BT module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a Power Amp Module (PAM), a frequency filter, a Low Noise Amplifier (LNA), or an antenna. According to another embodiment, at least one of the cellular module 221, the Wi-Fi module 223, the BT module 225, the GPS module 227, and the NFC module 228 may transmit and receive an RF signal through a separate RF module.

The Wi-Fi module 223 may indicate, for example, a module for establishing wireless Internet access and a wireless Local Area Network (LAN) link with an external device. The Wi-Fi module 223 may be located inside or outside the electronic device 201. Wireless Internet technologies may include Wi-Fi, WiGig, Wibro, world interoperability for microwave access (WiMax), High Speed Downlink Packet Access (HSDPA), millimeter Wave (mmWave), and the like. The Wi-Fi module 223 may interwork with an external device directly connected to the electronic device 201 or connected to the electronic device 201 through a network (for example, a wireless Internet network) (for example, the network 150) and may transmit various pieces of data of the electronic device 201 to the outside or receive the same from the outside. The Wi-Fi module 223 may always remain in an on state or may be turned on/turned off according to the configuration of the electronic device or user input.

The Bluetooth module 225 and the NFC module 228 may indicate, for example, short-range communication modules for performing short-range communication. Short-range communication technology may include Bluetooth, Bluetooth Low Energy (BLE), Radio Frequency Identification (RFID), Infrared communication (IrDA), Ultra Wideband (UWB), ZigBee, or NFC. The short-range communication module may interwork with an external device connected to the electronic device 201 through the network (for example, a short-range communication network), and may transmit various pieces of data of the electronic device 201 to the external device or receive the same from the external device. The short-range communication module (for example, the Bluetooth module 225 and the NFC module 228) may always remain in an on state or may be turned on/turned off according to the configuration of the electronic device 201 or user input.

The memory 230 may include, for example, an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, a Solid State Drive (SSD), and the like). The external memory 234 may include a flash drive, for example, a Compact Flash (CF), a Secure Digital (SD), a Micro-SD, a Mini-SD, an extreme Digital (xD), a Multi-Media Card (MMC), or a memory stick. The external memory 234 may be functionally or physically connected to the electronic device 201 through various interfaces.

According to various embodiments, the memory 230 may store one or more programs, data, or instructions related to measurement temperature of the electronic device 201 through the temperature sensor 240 and determination of a heat level by the processor 210. According to various embodiments, when a heat level of the electronic device 201 is higher than or equal to a predetermined level, the memory 230 may store one or more programs, data, or instructions related to the control of data throughput for each application based on application state information of the electronic device 201.

According to various embodiments, the memory 230 may store information on a heat level according to a measured temperature value, a control level for each application according to application state information (for example, a table for determining a control level for each application in [Table 1] below, and/or a data throughput control operation (for example, a data throughput control operation according to a throttling level of [Table 2] below) according to the control level.

The memory 230 may include an expandable memory (for example, the external memory 234) or an internal memory (for example, the internal memory 232). The electronic device 201 may also operate in relation to web storage performing a storage function of the memory 230 over the Internet.

The memory 230 may store one or more pieces of software (or software modules). For example, a software component may include an operating system software module, a communication software module, or one or more application software modules. Further, since the module, which is the software component, may be expressed as a set of instructions, the module may also be expressed as an instruction set. The module may also be expressed as a program. According to various embodiments of the disclosure, the memory 230 may include an additional module (instructions) as well as the above-described modules. Alternatively, the memory 230 may not use some modules (instructions) as unnecessary.

The operating system software module may include various software components for controlling overall system operation. Controlling the general system operation refers to, for example, managing and controlling the memory, controlling and managing storage hardware (device), and controlling and managing power. Further, the operating system software module may perform a function of smoothly supporting communication between various hardware (devices) and software components (modules).

The communication software module may enable communication with another electronic device, such as a wearable device, a smart phone, a computer, a server, or a portable terminal, through the communication module 220 or the interface (not shown). The communication software module may be formed in a protocol structure corresponding to a corresponding communication scheme.

The application module may include a web browser including a rendering engine, email, instant messaging, word processing, keyboard emulation, an address book, a touch list, widgets, Digital Rights Management (DRM), iris scan, context cognition, voice recognition, position-determining function, location-based service, and the like. According to various embodiments, the application module may include a health care application (for example, measurement of an amount of exercise or blood sugar) or an environmental information (for example, air pressure, humidity, or temperature information) provision application.

The temperature sensor 240 may measure, for example, temperature and convert the measured temperature information into an electric signal. The temperature sensor 240 may be included in a sensor module (not shown) including, for example, at least one of a gesture sensor, a gyro sensor, a barometer, a magnetic sensor, an acceleration sensor, a grip sensor, a proximity sensor, a color sensor 240H (for example, RGB (red, green, blue) sensor), a medical sensor, an illuminance sensor, or a Ultra Violet (UV) sensor. According to an embodiment, the electronic device 201 may further include a processor (for example, a low power processor, a Micro Controller Unit (MCU), or a Micro Processor Unit (MPU)) configured to control the sensor module as a part of the processor 210 or separately therefrom, and may control the sensor module while the processor 210 is in a sleep state.

The power management module 295 may manage, for example, power of the electronic device 201. According to an embodiment, the power management module 295 may include a power management integrated circuit (PMIC), a charger IC, or a battery or fuel gauge (or a battery gauge).

The PMIC may use a wired and/or wireless charging method. The wireless charging method may include, for example, a magnetic resonance scheme, a magnetic induction scheme, or an electromagnetic wave scheme. The PMIC may further include an additional circuit for wireless charging, for example, a coil loop, a resonance circuit, or a rectifier. The battery gauge may measure, for example, the residual amount of the battery 296, a voltage, a current, or temperature while charging. The battery 296 may include, for example, a rechargeable battery and/or a solar battery.

The electronic device 201 according to various embodiments may include, for example, a mobile TV support device (for example, a GPU) which may process media data according to a standard, such as Digital Multimedia Broadcasting (DMB), Digital Video broadcasting (DVB), or mediaFlo™.

Each of the above-described component elements of hardware according to the disclosure may be configured with one or more components, and the names of the corresponding component elements may vary based on the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

Figure 3:
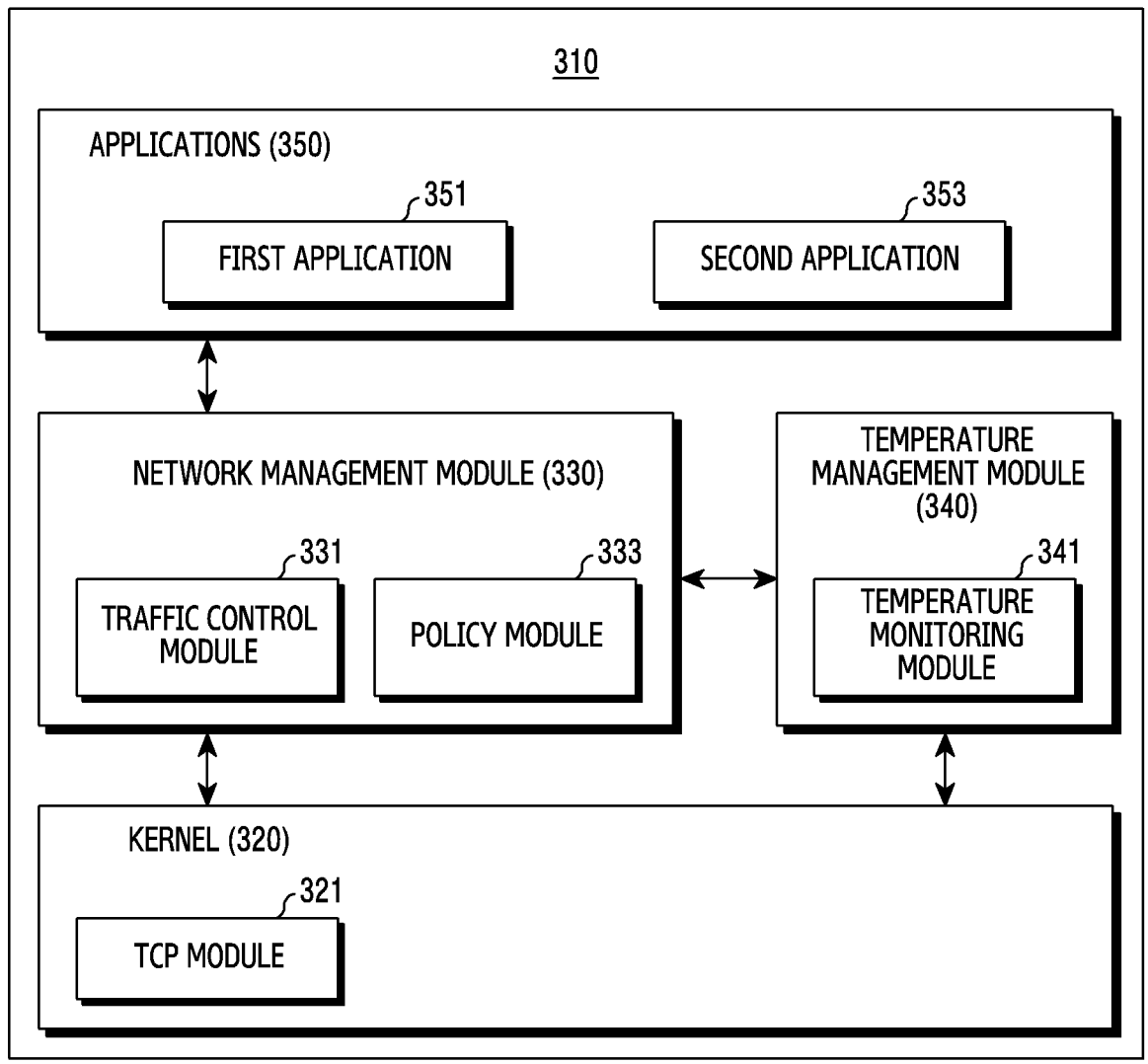
FIG. 3 is a block diagram of a program module according to various embodiments of the disclosure.

FIG. 3 is a block diagram of a program module according to various embodiments of the disclosure.

According to an embodiment, the program module 310 may include an operating system for controlling resources related to the electronic device (for example, the electronic device 101 or 201) and/or various applications executed in the operating system. The operating system may include, for example, Android™, iOS™, Windows™, Symbian™, Tizen™, or Bada™.

Referring to FIG. 3, the program module 310 may include a kernel 320, a network management module 330 (for example, the network management module 113), a temperature management module 340 (for example, the temperature management module 111), and/or applications 350. At least a portion of the program module 310 may be preloaded to the electronic device or may be downloaded from an external electronic device.

The kernel 320 may include, for example, a Transmission Control Protocol (TCP) module 321. The TCP module 321 may support a connection-type service in a layer higher than an Internet Protocol (IP).

According to an embodiment, the kernel 320 may include a system resource manager and/or a device driver. The system resource manager may control, allocate, or withdraw system resources. The device driver may include, for example, a display driver, a camera driver, a Bluetooth driver, a shared memory driver, a USB driver, a keypad driver, a Wi-Fi driver, an audio driver, or an Inter-Process Communication (IPC) driver.

The network management module 330 may receive heat level information from, for example, the temperature management module 340 and identify a data communication-related operation of an application being executed. Further, the network management module 330 may control network throughput by analyzing a state of the application being executed.

According to an embodiment, the network management module 330 may include a traffic control module 331 and/or a policy module 333. For example, the traffic control module 331 may identify the application being executed and operation state information of the application. The traffic control module 331 may determine data throughput for each application on the basis of the state information of the application being executed. For example, the traffic control module 331 may control data throughput of each application according to the determined data throughput for each application and resolve the heat problem of the electronic device therethrough. The policy module 333 may manage, for example, a control level for each application and a data throughput policy according to a level. For example, the control level and the data throughput policy may be information preset and stored in the electronic device 101. According to another embodiment, the policy module 333 may change a policy according to a time point at which the electronic device 101 is used and/or location information. For example, the policy module 333 may periodically receive policy information through an external server and update the same.

The temperature management module 340 may include a temperature monitoring module 341. For example, the temperature monitoring module 341 may periodically measure temperature values through the temperature sensor 240 and obtain temperature of an external surface of the electronic device 201. The temperature monitoring module 341 may compare the obtained temperature and a reference value and make a request for controlling the data communication-related operation to the network management module 330.

According to an embodiment, the temperature monitoring module 341 may be an independent module for determining the temperature sensor 240 and a temperature sensor value in a separate external IC.

The applications 350 may include, for example, a first application 351 and/or a second application 353. The first application 351 and/or the second application 353 may include a home application, a dialer application, an SMS/MMS application, an Instant Message (IM) application, a browser application, a camera application, an alarm application, a contact application, a voice dial application, an email application, a calendar application, a media player application, an album application, and a watch application. According to various embodiments, the applications 350 may include a health care application (for example, measurement of an amount of exercise or blood sugar) or an environmental information (for example, air pressure, humidity, or temperature information) provision application.

According to an embodiment, the applications 350 may include an information exchange application that may support the exchange of information between the electronic device 201 and an external electronic device. The information exchange application may include, for example, a notification relay application for transferring specific information to an external electronic device or a device management application for managing an external electronic device.

For example, the notification relay application may transfer notification information generated in another application of the electronic device to an external electronic device or may receive notification information from an external electronic device to provide the received notification information to the user. The device management application may perform a function of an external electronic device (for example, a function of turning on/off the external electronic device (or some elements thereof) or controlling brightness (or resolution) of the display) communicating with the electronic device or may install, delete, or update an application executed by the external electronic device.

According to an embodiment, the applications 350 may include applications (for example, a health care application of a mobile medical appliance) that are designated according to the attributes of the external electronic device.

According to an embodiment, the applications 350 may include applications received from the external electronic device. At least a portion of the program module 310 may be implemented (for example, executed) by software, firmware, hardware (for example, the processor 210), or a combination of two or more thereof and may include a module, a program, a routine, an instruction set, or a process for performing one or more functions.

The term "module" used herein may include a unit consisting of hardware, software, or firmware, and may be used interchangeably with, for example, the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (for example, modules or functions thereof) or methods (for example, operations) according to various embodiments may be implemented by an instruction that is stored in a computer-readable storage medium (for example, the memory 230 of FIG. 2) in the form of a program module. When the instruction is executed by the processor (for example, the AP 110 of FIG. 1 or the processor 210 of FIG. 2), the processor may perform a function corresponding to the instruction.

The computer-readable recording medium may include a hard disk, a floppy disk, magnetic media (for example, a magnetic tape), optical recording media (for example, Compact Disc Read Only Memory (CD-ROM), a Digital Versatile Disc (DVD), magneto-optical media (for example, a floptical disk)), and an internal memory. The instruction may include code made by a compiler or code that can be executed by an interpreter. The programming module according to the disclosure may include one or more of the aforementioned elements or may further include other additional components, or some of the aforementioned elements may be omitted.

According to various embodiments, the recording medium may include a computer-readable recording medium having a program recorded therein to execute various methods described below in the processor 110 or 210.

The operations performed by modules, programming modules, or other elements according to various embodiments may be performed in a sequential, parallel, repetitive, or heuristic manner, and some of the operations may be performed in different orders or omitted, or other operations may be added.

An electronic device 101 or 201 according to various embodiments may include: at least one sensor 140 or 240 used to measure a temperature of the electronic device 101 or 201; and at least one processor 110 or 210 configured to identify an operation state of at least one application being executed in the electronic device, and when the measured temperature is higher than or equal to a reference value, control data throughput for each of the at least one application based on the operation state of the at least one application.

According to an embodiment, the operation state of the at least one application may include at least one factor among a resource use rate of the at least one application, operation in an FG) or a BG, an accumulated amount of transmitted and received data, current consumption, and a type of an RAT which the electronic device 101 or 201 is accessing.

According to an embodiment, the current consumption of the at least one application may be obtained based on a number of packets per unit time generated by the at least one application and current consumption per unit time of the electronic device 101 or 201.

According to an embodiment, the at least one processor 110 or 210 may determine a data throughput control level for each of the at least one application based on the operation state of the at least one application, determine data throughput corresponding to the control level according to a data throughput policy, and control transmission and reception traffic for each of the at least one application according to the determined data throughput.

According to an embodiment, the data throughput policy may be information preset and stored in the electronic device 101 or 201 or periodically updated from an external device, and the measured state of the electronic device 101 or 201 may include at least one piece of information on a time point at which the electronic device 101 or 201 is used and information on a location at which the electronic device 101 or 201 is used.

According to an embodiment, the at least one processor 110 or 210 may measure the state of the electronic device 101 or 201 and determine the data throughput policy on the basis of the measured state of the electronic device 101 or 201.

According to an embodiment, the at least one processor 110 or 210 may determine data throughput corresponding to the control level on the basis of the determined data throughput policy.

According to an embodiment, the electronic device may further include a memory 230 configured to store a data throughput control history for each of the at least one application, and the at least one processor 110 or 210 may control data throughput for each application being executed on the basis of the stored data throughput control history when the temperature of the electronic device 101 or 201 becomes higher than or equal to the reference value.

According to an embodiment, the at least one processor 110 or 210 may compare the measured temperature with a reference value, determine a heat level of the electronic device, and control data throughput for each of the at least one application on the basis of the operation state of the at least one application when the heat level is higher than or equal to a preset reference.

According to various embodiments, the electronic device may detect heat due to a change in temperature, and accordingly, the operation of the electronic device for controlling data throughput for each application may be performed as illustrated in FIGS. 4 to 10. For convenience of description, the configurations and operations illustrated in FIGS. 4 to 10 are described as the configurations and operations of the electronic device 101, but the scope of the disclosure is not limited thereto.

Figure 4:
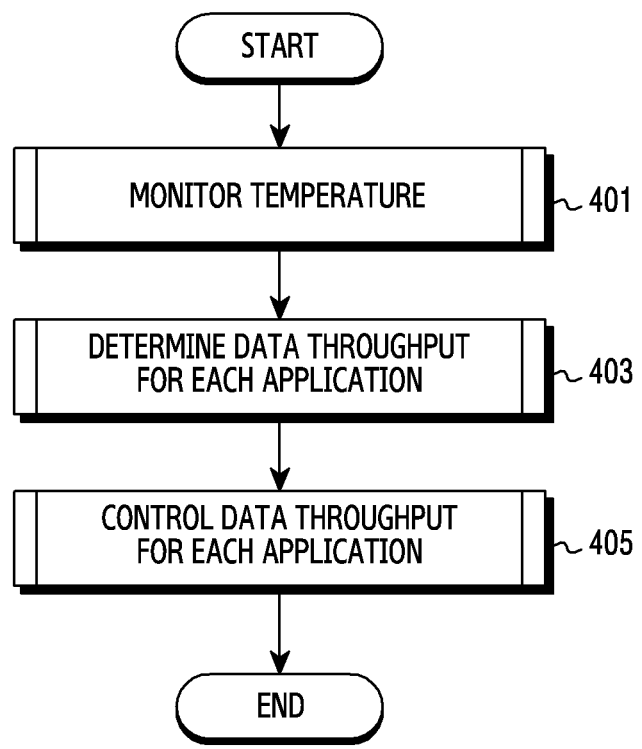
FIG. 4 illustrates an operation in which the electronic device detects heat and controls data throughput for each application according to various embodiments of the disclosure.

FIG. 4 illustrates an operation in which the electronic device detects heat and controls data throughput for each application according to various embodiments of the disclosure. For example, the operations in FIG. 4 may be the operations of the electronic device 101 (for example, the processor 210).

Referring to FIG. 4, in operation 401, the electronic device 101 according to various embodiments may monitor a temperature. For example, when a predetermined period or a specific condition is satisfied, the electronic device 101 may measure the temperature through at least one sensor of the electronic device 101 and compare the measured temperature with a reference temperature. According to an embodiment, the electronic device 101 may measure temperature values of the electronic device 101 through at least one temperature sensor 140 according to each period or each condition. The electronic device 101 may obtain a surface temperature of the electronic device 101 on the basis of the measured temperature values and determine whether the obtained surface temperature is higher than a reference value.

In operation 403, the electronic device 101 according to various embodiments may determine data throughput for each application. For example, the electronic device 101 may identify at least one application being executed and an operation state of the application and determine data throughput for each application according thereto. According to an embodiment, the electronic device 101 may identify the operation and the state of at least one application and determine a data throughput control level for each application being executed. At this time, the electronic device 101 may identify the operation and the state only for applications that satisfy a preset condition rather than all applications of the electronic device 101. For example, the electronic device 101 may identify whether the state of the currently executed application is a foreground operation state or target only applications of which a current data session is maintained.

In operation 405, the electronic device 101 according to various embodiments may control data throughput for each application. For example, the electronic device 101 may control data throughput for each application according to the data throughput determined in operation 403. According to an embodiment, the electronic device 101 may identify data throughput corresponding to the control level determined for each application and change the data throughput according to each application.

According to the embodiment described with reference to FIG. 4, the electronic device 101 may control data throughput according to each application, thereby handling the heat problem. According to the embodiment of FIG. 4, the electronic device 101 may consider the operation state of the application. According to another embodiment, the electronic device 101 may further consider a Radio Access Technology (RAT). For example, the electronic device 101 may determine data throughput for each application according to the RAT. For example, the electronic device 101 accessing through a new RAT may have a more serious heat problem than the electronic device using the existing legacy communication scheme. Accordingly, the electronic device 101 accessing through the new RAT may control the heat problem by controlling data throughput for each application to be lower than that of the legacy communication scheme. According to another embodiment, in an environment in which legacy communication scheme and the new RAT coexist, the electronic device 101 may differently configure data throughput control levels of the corresponding application according to whether the application is an application requiring new RAT access for data communication or an application dedicated for the new RAT. For example, the legacy communication scheme may include an LTE communication scheme of $4^{th}$ Generation (4G) and the new RAT may include a $5^{th}$ Generation (5G) communication scheme.

Figure 5:
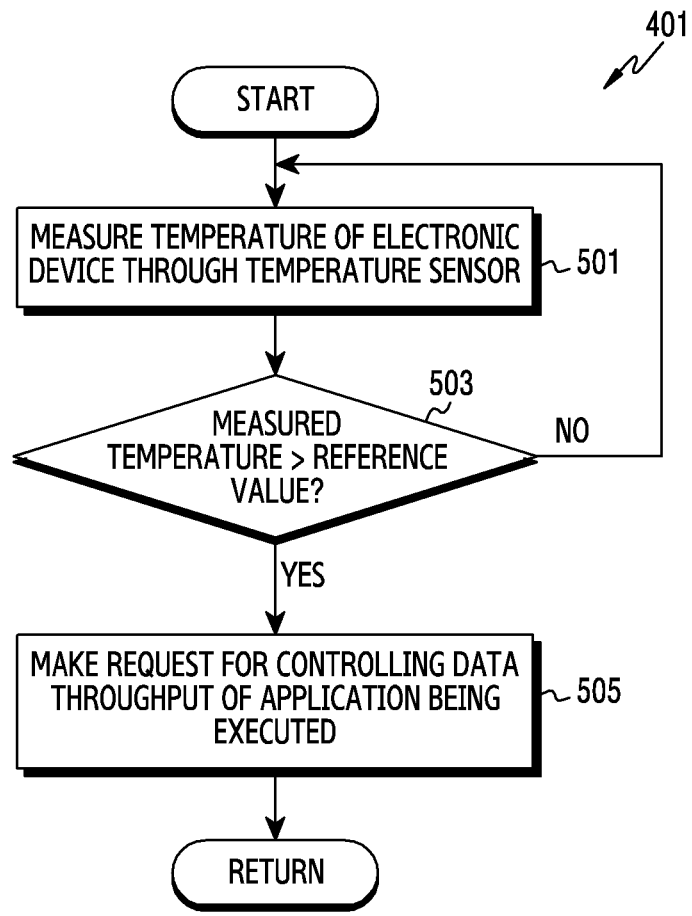
FIG. 5 illustrates the flow of the operation in which the electronic device detects heat according to various embodiments of the disclosure.

FIG. 5 illustrates the flow of the operation in which the electronic device detects heat according to various embodiments of the disclosure. For example, the operations in FIG. 5 may be the operations of the electronic device 101 (for example, the processor 210). When the electronic device 101 monitors a temperature in operation 401 of FIG. 4, the electronic device 101 may perform detailed operations described below.

Referring to FIG. 5, in operation 501, the electronic device 101 according to various embodiments may measure a temperature of the electronic device through a temperature sensor. For example, the electronic device 101 may measure the temperature of the electronic device 101 through at least one temperature sensor, and at this time, the electronic device 101 may measure the temperature when a predetermined period or a specific condition is satisfied. According to an embodiment, the temperature management module 340 of the electronic device 101 may measure temperature values of the electronic device through at least one temperature sensor 140 according to each period or each condition. The temperature management module 340 may obtain a surface temperature of the electronic device on the basis of the measured temperature values.

In operation 503, the electronic device 101 according to various embodiments may determine whether the measured temperature is higher than a reference value. For example, the electronic device 101 may determine whether the surface temperature obtained in operation 501 is higher than the predetermined reference value. According to an embodiment, the electronic device 101 may compare the measured temperature value with a plurality of reference values and classify the temperature value as one of a plurality of heat levels. For example, level 1 indicates an initial heat step and level 2 may indicate a dangerous heat step. According to an embodiment, the electronic device 101 may not perform a separate heat control operation in level 1 on the basis of the heat level step. According to another embodiment, when there is a session causing unnecessary data transmission and reception in level 1, the electronic device 101 may perform initial heat control by removing the session. When the level is higher than or equal to level 2, the electronic device 101 may make a request for controlling data throughput for each application. In an embodiment, when it is determined that the measured temperature is higher than the reference value in operation 503, the electronic device 101 may perform operation 505. In another embodiment, when it is determined that the measured temperature is equal to or lower than the reference value in operation 503, the electronic device 101 may return to operation 501 and repeat periodic temperature measurement.

In operation 505, the electronic device 101 according to various embodiments may make a request for controlling data throughput for each application being executed. For example, when it is determined that the measured temperature is higher than the reference value in operation 503, the electronic device 101 may make a request for controlling data throughput of the application being executed. According to an embodiment, when it is determined that the measured temperature is higher than the reference value, the temperature management module 340 may make a request for controlling data traffic for each application to the network management module 330.

Figure 6:
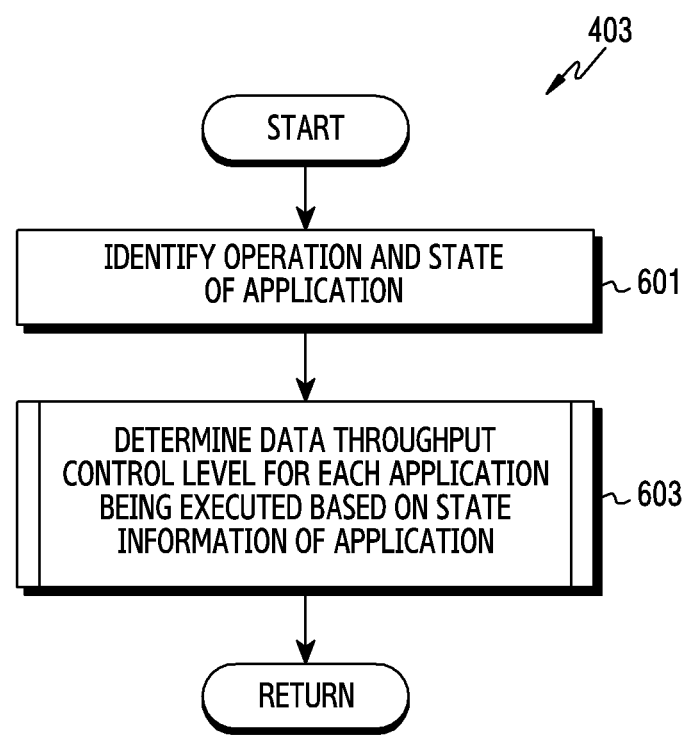
FIG. 6 illustrates a method by which the electronic device determines data throughput according to the state of each application according to various embodiments of the disclosure.

FIG. 6 illustrates a method by which the electronic device determines data throughput according to the state of each application according to various embodiments of the disclosure. For example, the operations in FIG. 6 may be the operations of the electronic device 101 (for example, the processor 210). When data throughput for each application is determined in operation 403 of FIG. 4, the electronic device 101 may perform detailed operations below.

Referring to FIG. 6, in operation 601, the electronic device 101 according to various embodiments may identify the operation and the state of at least one application. For example, the electronic device 101 may identify at least one application being currently executed and identify the operation state of the application. According to an embodiment, the network management module 330 of the electronic device 101 may identify whether there is a data communication-related operation of the currently executed application. For example, the network management module 330 may determine whether a communication protocol of the application is open, a session is maintained, or the size of recently transmitted/received data is larger than or equal to a predetermined size. Accordingly, the network management module 330 may determine whether there is the data communication-related operation of the application being executed. For example, the electronic device 101 may collect a CPU occupancy rate for each of at least one application being currently executed, FG/BG (background) operation information, or state information of a factor value of accumulated transmitted and received data. According to another embodiment, the electronic device may identify whether the currently accessed RAT is the existing legacy communication scheme or the new RAT. According to an embodiment, the electronic device 101 may identify only the state of applications that satisfy a preset condition rather than all applications of the electronic device 101. For example, the electronic device 101 targets only applications of which a current data session is maintained or only applications of which an amount of accumulated transmitted/received data is larger than or equal to a predetermined reference value. For example, the electronic device 101 may periodically monitor state information for each application.

In operation 603, the electronic device 101 according to various embodiments may determine a data throughput control level for each application being executed on the basis of the application state information. For example, the electronic device 101 may determine the control level for each application being executed on the basis of the application state information collected in operation 601 and accordingly control data throughput for each application.

Figure 7:
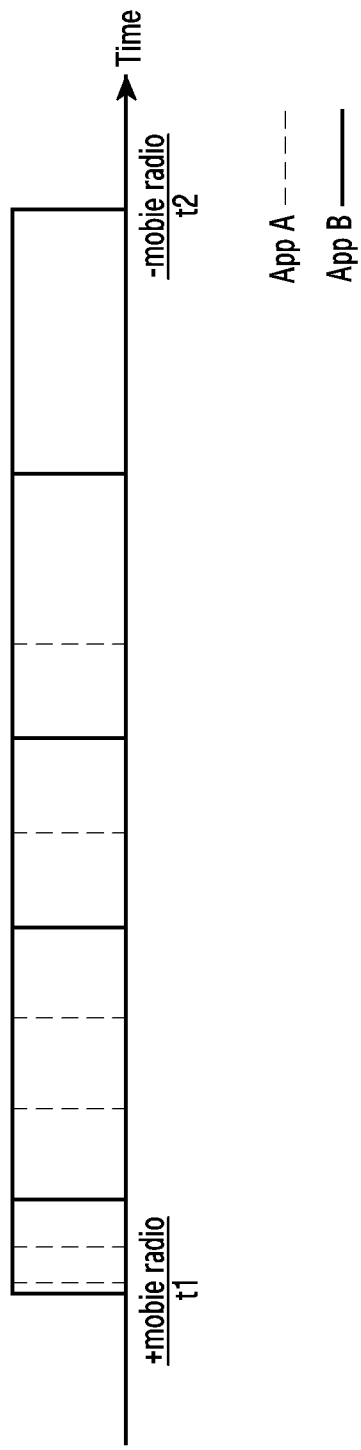
FIG. 7 illustrates an example in which the electronic device transmits packets for each application according to various embodiments of the disclosure.

According to an embodiment, the network management module 330 may determine a data throughput control level for each application on the basis of a CPU occupancy rate for each application, FG/BG operation information, or factors of accumulated transmitted/received data, collected in operation 601. According to another embodiment, the network management module 330 may calculate accumulated current consumption at a time point at which each application is executed on the basis of accumulated transmitted/received data for each application and determine a data throughput control level in consideration of the accumulated current consumption for each application. For example, the electronic device 101 may estimate current consumption on the basis of a radio active time for each application. The current consumption for each application may be calculated on the basis of the number of transmitted and received packets for each application for a predetermined time as illustrated in FIG. 7. Referring to FIG. 7, the electronic device 101 may identify the number of generated packets for each application from a time point t1 to a time point t2. For example, a total number of generated packets from the time point t1 to the time point t2 is 10, the number of packets generated for application A is 6, and the number of packets generated for application B is 4. According to an embodiment, a ratio of the radio active time may be obtained through [Equation 1] according to a ratio of the number of packets generated for a specific time.

$$(t_2-t_1) \times (\text{number of generated packets})/(\text{total number of packets}) \quad [\text{Equation 1}]$$

$t_1$ and $t_2$ denote a start time point and an end time point of a time interval during which the number of generated packets is obtained. For example, when $(t_2-t_1)$ is 60 seconds, a radio active time of application A may be 60 s*6/10=36 s. A radio active time of application B may be 60 s*4/10=24 s. When a total of current consumption per time is 150 mA, current consumption of application A may be 150 mA*36/(60*60)=1.5 mA and current consumption of application B may be 150 mA*24/(60*60)=1 mA.

According to another embodiment, current consumption may be obtained on the basis of the use of radio packets for each application. For example, the electronic device 101 may determine current consumption on the basis of the use of Wi-Fi packets as shown in [Equation 2].

$$\text{wifipower} = (\text{RXpacket} + \text{TXpacket}) \times \text{PacektPowerconsumption} \qquad \text{[Equation 2]}$$

An RX packet denotes a number of packets received by an application, a TX packet denotes a number of packets transmitted by an application. PacektPowerconsumption denotes an amount of current consumed per packet. According to an embodiment, the electronic device 101 may obtain current consumption according to the number of generated packets of the application based on current consumption per packet through [Equation 2].

According to an embodiment, the current consumption may be obtained through current sensing by the PMIC as well as the method of estimating accumulated transmitted and received packets. For example, the power management module 295 may acquire current consumption information by detecting the current according to a predetermined period through the communication module 220.

[Equation 1] and [Equation 2] above may be embodiments for obtaining the ratio of the radio active time and the current consumption, and the ratio of the radio active time for each application and the current consumption may be obtained by other equations or algorithms.

According to an embodiment, a table for determining a control level for each application based on the aforementioned factors may be determined as shown in [Table 1].

TABLE 1

| APP | CPU occupancy rate | FG/BG | Downlink/Uplink | Power Consumption | Throttling Level |
|-----|--------------------|-------|-----------------|-------------------|------------------|
| #1  | 20                 | FG    | 1 G/0.2 G       | 500 mA            | Level 1          |
| #2  | 5                  | BG    | 0.2 G/0.1 G     | 300 mA            | Level 2          |
| #3  | 5                  | BG    | 0.5 G/0.1 G     | 200 mA            |                  |

[Table 1] shows CPU occupancy rates, FG/BG operation states, accumulated amounts of transmitted and received data, and current consumption information of three applications being executed. According to an embodiment, the electronic device 101 may determine a throttling level which is a data throughput control level according to a predefined reference on the basis of state information for each application as shown in [Table 1]. For example, the electronic device 101 may determine the throttling level to be 1 when at least some (the reference number, for example, three) of the CPU occupancy rate, the FG/BG operation state, the accumulated amounts of transmitted and received data, and current consumption factor value exceed a predetermined reference. In another example, when factors smaller than at least some (the reference number, for example, three) of the above-listed factors (for example, one or two factors) are satisfied, the electronic device 101 may configure the throttling level corresponding to the number of the satisfied factors. For example, when two factors are satisfied, the electronic device 101 may configure the throttling level as 2. Alternatively, when one or fewer factors is satisfied, the electronic device may not determine the throttling level in order not to control data throughput. According to another embodiment, the data throughput control levels are not limited to the above-described three levels and may be configured as one or more levels on the basis of state information of the electronic device 101 and/or a preset reference.

According to other embodiments, the electronic device 101 may configure priorities of the factors and, when values of the corresponding factors satisfy a condition, configure the throttling level to be lower and control data throughput to be reduced. For example, the electronic device 101 may configure throttling levels of an application executed in the BG and a value having high current consumption to be lower. A reference for determining the throttling level may be preset and stored in the electronic device 101 (for example, the memory 230) or may be remotely controlled by an external device.

According to other embodiments, the electronic device 101 may determine data throughput for each application according to an accessed RAT. For example, the electronic device 101 accessing a new RAT can more rapidly transmit large data in comparison to the legacy communication scheme, and thus may have a quickly increasing heat speed. Accordingly, the electronic device 101 accessing the new RAT may control the heat state by controlling data throughput for each application to be lower than that of the legacy communication scheme. According an embodiment, when the electronic device 101 accesses the new RAT, the electronic device 101 may configure the throttling level to be lower than the legacy communication scheme by 1 level or higher. According to another embodiment, in an environment in which the legacy communication scheme and the new RAT coexist, if the application is an application requiring access to the new RAT for data communication or if the application is a new RAT-dedicated application, the electronic device 101 may configure the throttling level of the corresponding application to be lower by 1 level or lower. Accordingly, the electronic device 101 may control data throughput for each application through the new RAT to be lower. For example, the legacy communication scheme may include an LTE communication scheme of 4G, and the new RAT may include a 5G communication scheme.

According to an embodiment, an operation of controlling data throughput according to a throttling level determined by the network management module 330 of the electronic device 101 may be defined as shown in [Table 2].

TABLE 2

| Level   | Throttling              |
|---------|-------------------------|
| Level 1 | 50% Download/50% Upload |
| Level 2 | 30% Download/30% Upload |
| Level 3 | 20% Download/20% Upload |

Referring to [Table 2], level 1 may indicate restriction of data transmission and reception by reducing current data download/upload throughput to 50%, level 2 may indicate restriction of data transmission and reception by reducing current data download/upload throughput to 30%, and level 3 may indicate restriction of data transmission and reception by reducing current data download/upload throughput to 20%. According to another embodiment, download and uplink throughput may have different values at the same level.

According to an embodiment, a throttling level may be determined according to a state of each application and the content of an operation for controlling data throughput according to the level may be included in the control policy. For example, the policy module 415 of the electronic device 101 may manage the control policy. The control policy may be preset by the electronic device 101 or may be updated through an external server periodically or according to a condition.

[Table 1] showing the control level for each application and [Table 2] showing the operation for controlling data throughput are only embodiments, and determination of the control level for each application and the operation for controlling data throughput according to the control level may include other configurations other than the configuration included in [Table 1] and [Table 2] or may be defined in another form.

According to an embodiment, when data throughput is controlled according to the application state, the experiment result about reduction in current consumption may be as shown in [Table 3]. For example, 4 shared applications may be used for download experiment. An experiment method may be performed by attempting download of four pieces of data having a total size of 1.4 GB for 10 minutes while there is no heat. For example, in the experiment result of [Table 3], a speed is about 45 to 50 Mbps in the state in which a traffic control function is turned off because there is no limitation on data throughput and the throughput is controlled in units of 10 Mbps.

TABLE 3

| Limitation on T/P | Current consumption (mA) | Size of data downloaded for 10 minutes |
| --- | --- | --- |
| No limitation | 497 | 2071 MB |
| 40 Mbps | 465 | 2375 MB |
| 30 Mbps | 455 | 2071 MB |
| 20 Mbps | 399 | 1256 MB |
| 10 Mbps | 365 | 665 MB |

Referring to [Table 3], controlling throughput in units of 10 Mbps results in reduction of current consumption that is gradual but is not linear. As shown in the experiment result, it may be noted that the size of data downloaded within a unit time is reduced according to the limitation on throughput but the result may be intended to reduce current consumption. The reduction in current consumption means reduction in a heat factor and thus the heat state may be controlled by controlling data throughput for each application presented by the disclosure as shown in the experiment result of [Table 3].

Figure 8:
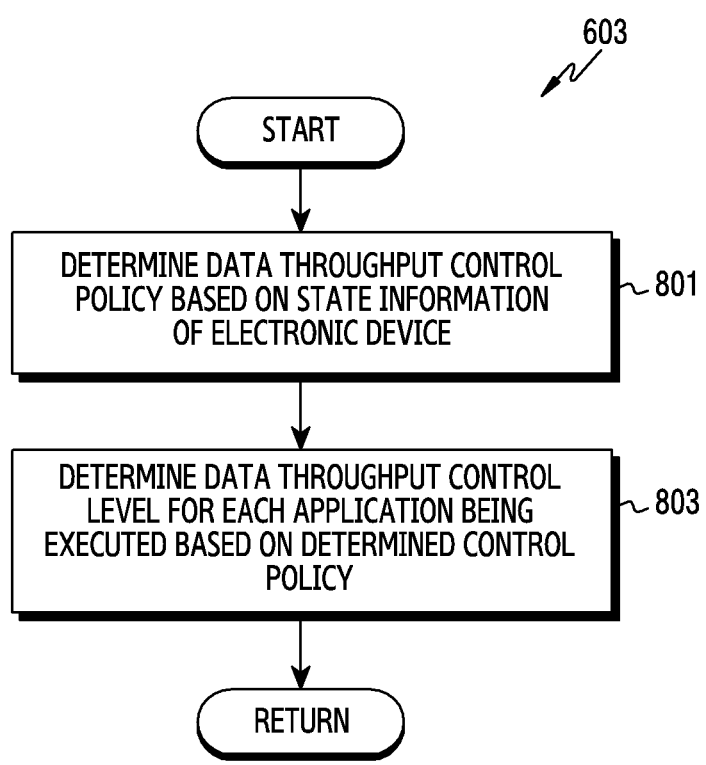
FIG. 8 illustrates an example in which the electronic device determines a data throughput control policy and determines a control level for each application according to various embodiments of the disclosure.

FIG. 8 illustrates an example in which the electronic device determines a data throughput control policy and determines a control level for each application according to various embodiments of the disclosure. For example, the operations in FIG. 8 may be the operations of the electronic device 101 (for example, the processor 210). When the data throughput control level for each application being executed is determined in operation 603 of FIG. 6, the electronic device 101 may perform detailed operations described below.

Referring to FIG. 8, in operation 801, the electronic device 101 according to various embodiments may determine a data throughput control policy on the basis of state information of the electronic device 101. For example, the electronic device 101 may determine a throttling level based on state information of the electronic device 101 and a policy for a data throughput control operation according to the level. For example, the network management module 330 may change the policy according to the time point at which the electronic device 101 is used (for example, summer or winter) and/or location information of the electronic device 101 (for example, whether the location corresponds to a cold country or a hot country based on latitude information). According to another embodiment, the network management module 330 may change the policy according to the type of the RAT which the electronic device 101 accesses.

According to an embodiment, the electronic device 101 may update the policy stored in the electronic device 101 (for example, the memory 230) or update the policy through an external server periodically or when a condition is satisfied. According to another embodiment, the electronic device 101 may omit operation 801 and directly perform operation 803.

In operation 803, the electronic device 101 according to various embodiments may determine the data throughput control level for each application, being executed, on the basis of the control policy. For example, the electronic device 101 may determine the control level for each application, being executed, on the basis of collected application state information and the control policy, stored in the electronic device 101 or determined in operation 801, and accordingly, may control the data throughput for each application. According to an embodiment, the electronic device 101 may compare factors such as the CPU occupancy rate for each application, FG/BG operation information, accumulated transmitted and received data, current consumption for each application, and/or the type of accessed RAT with a reference value according to the policy for determining a throttling level and determine the data throughput control level for each application.

According to an embodiment, the updated policy for the data throughput control operation according to the throttling level may include the content shown in [Table 2] above, and the electronic device 101 may control the data throughput for each application on the basis of the updated policy.

Figure 9:
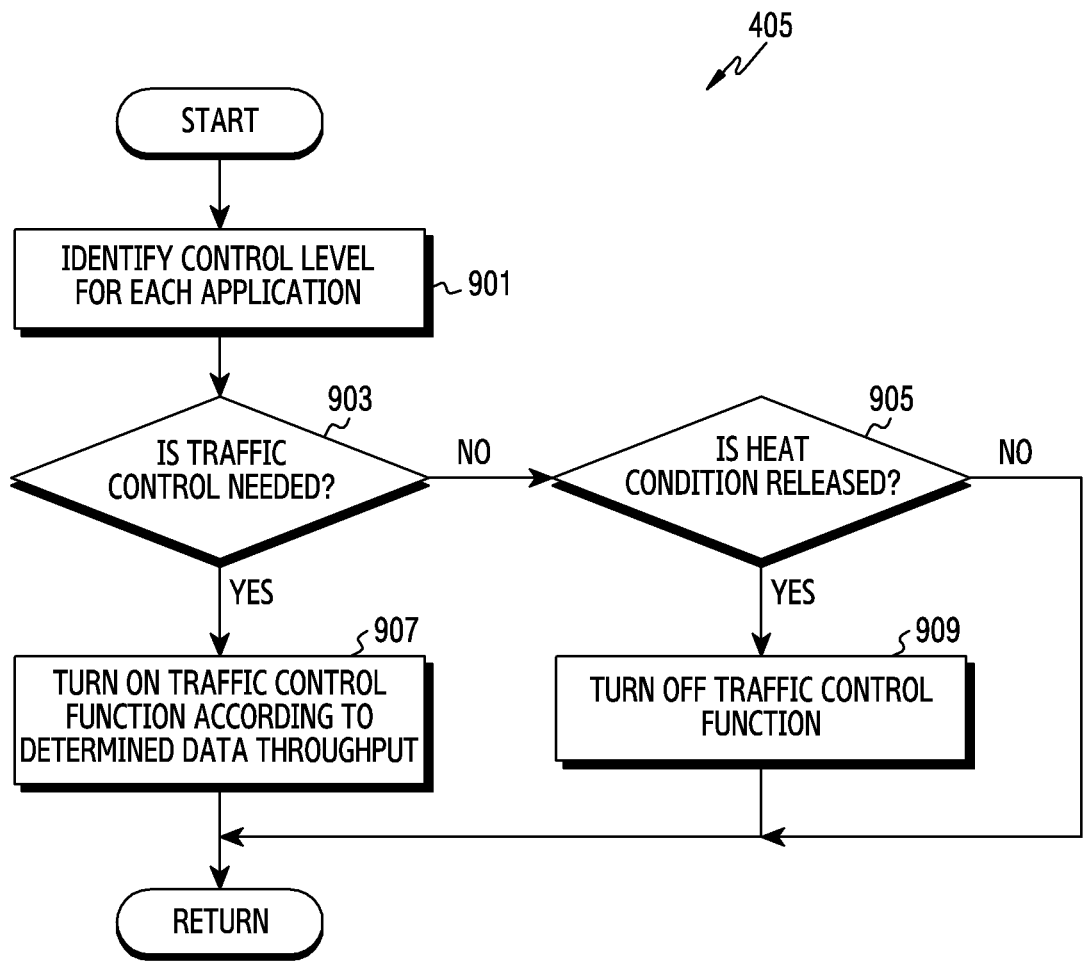
FIG. 9 is a flowchart illustrating an operation in which the electronic device turns on/off a traffic control function according to various embodiments of the disclosure.

FIG. 9 is a flowchart illustrating an operation in which the electronic device turns on/off a traffic control function according to various embodiments of the disclosure. For example, the operations in FIG. 9 may be the operations of the electronic device 101 (for example, the processor 210). When the data throughput for each application is controlled in operation 401 of FIG. 4, the electronic device 101 may perform detailed operations described below.

Referring to FIG. 9, in operation 901, the electronic device 101 according to various embodiments may identify an application control level. For example, the electronic device 101 may identify a data throughput control level determined for each application and data throughput corresponding thereto in order to control traffic.

In operation 903, the electronic device 101 according to various embodiments may determine whether traffic needs to be controlled. For example, the electronic device 101 may determine whether traffic needs to be controlled according to the data throughput control level of each application in operation 901. According to an embodiment, the electronic device 101 may determine that traffic needs to be controlled when the control level of each application is determined as one of level 1 to level 3, and determine that traffic does not need to be controlled when there is no determined application control level. According to an embodiment, when it is determined that traffic does not need to be controlled by the application control level, the electronic device 101 may perform operation 905. According to another embodiment, when it is determined that traffic needs to be controlled by the application control level, the electronic device 101 may perform operation 907.

When it is determined that traffic does not need to be controlled, the electronic device 101 according to various embodiments determines whether a heat condition is released. For example, when it is determined that traffic does not need to be controlled by the application control level in operation 903, the electronic device may determine whether the heat condition is released since the current surface temperature of the electronic device 101 does not reach a preset reference. The electronic device 101 may make a request for controlling data throughput of the application being executed. According to an embodiment, when it is determined that the temperature measured by the temperature management module 340 is higher than the reference value, the temperature management module 340 may make a request for controlling data traffic for each application to the network management module 330. When it is determined that the heat condition is released, the electronic device may perform operation 909. Although heat continues, the electronic device 101 may perform operation 909 even when traffic does not need to be controlled according to determination of the application control level. According to an embodiment, when it is determined that the heat condition is not released, the electronic device 101 may terminate the operations.

When it is determined that traffic needs to be controlled, the electronic device 101 according to various embodiments may turn on the traffic control function according to the determined data throughput in operation 907. For example, the electronic device 101 may turn on the function such that traffic is controlled according to the data throughput corresponding to the application control level identified in operation 901. According to an embodiment, the electronic device 101 may configure the traffic control of the kernel 320 to achieve the determined data throughput. The electronic device 101 may control traffic according to the determined data throughput separately in uplink and downlink.

When it is determined that the heat state is released, the electronic device 101 according to various embodiments may turn off the traffic control function. For example, when it is determined that the heat state is released according to the surface temperature of the electronic device in operation 905, the electronic device 101 may turn off the function not to control traffic. When it is determined that the traffic control of the application is not needed in operation 905, the electronic device 101 may also turn of the function not to control traffic. According to an embodiment, the electronic device 101 may turn off the traffic control function of the kernel 320 according to settings.

Figure 10:
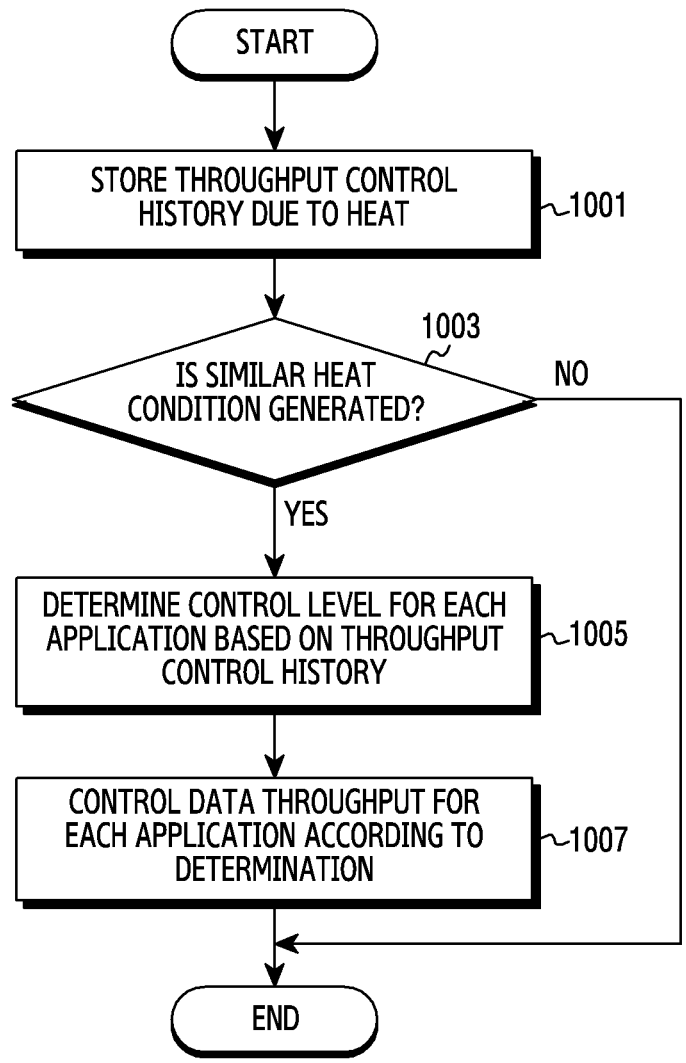
FIG. 10 illustrates an example in which the electronic device controls data throughput for each application on the basis of a heating control history according to various embodiments of the disclosure.

FIG. 10 illustrates an example in which the electronic device controls data throughput for each application on the basis of a heat control history according to various embodiments of the disclosure. For example, the operations of FIG. 10 may be the operations of the electronic device 101 (for example, the processor 210) based on machine learning.

Referring to FIG. 10, in operation 1001, the electronic device 101 according to various embodiments stores a throughput control history due to heat. For example, the electronic device 101 may store, according to a condition, a history for controlling data throughput for each application in the past heat condition.

In operation 1003, the electronic device 101 according to various embodiments may determine whether a similar heat condition is generated. For example, the electronic device 101 may determine whether a heat condition similar to the past heat control history is generated during a periodic temperature monitoring operation of the electronic device. According to an embodiment, the electronic device 101 may measure a temperature value through at least one temperature sensor 140 and identify a state of an application being executed. When at least one factor of the type of the application, being executed, the CPU occupancy rate, the FG/BG operation state, the accumulated amount of transmitted and received data, current consumption, or the type of accessed RAT is the same as or similar to the heat control condition generated in the past, the electronic device 101 may determine the heat condition is similar to the past heat history. According to an embodiment, when it is determined that the heat condition similar to the past history is generated, the electronic device 101 may perform an operation for controlling heat on the basis of the past history in operation 1005. According to another embodiment, when it is determined that the similar heat condition is not generated, the electronic device 101 may terminate the operations. The electronic device 101 may control the heat condition according to a predefined heat control policy without considering the past history.

When it is determined that the heat condition is generated, the electronic device 101 according to various embodiments may determine a control level for each application on the basis of a throughput control history in operation 1005. For example, when it is determined that traffic needs to be controlled due to the heat condition of the electronic device 101 in operation 1003, the electronic device 101 may determine a control level for each application on the basis of the throughput control history stored for each application. According to an embodiment, the electronic device 101 may determine a throttling level for each application according to a throttling level determination policy based on an application state and may additionally control the throttling level on the basis of the data throughput control history of each application in the past. For example, when the same application has a similar CPU occupancy rate, an FG/BG operation state, and similar current consumption, if throttling level 1 is applied and the heat state is released, the electronic device 101 may determine the throttling level of the corresponding application to be 1 even though the throttling level should be configured as level 2 based on the throttling level policy. According to other embodiments, when the heat state is released after data throughput for throttling level 1 is controlled by 70% in a similar state of the same application in the past, the electronic device 101 may control throughput by 70% in spite of the control policy for the throttling level. Through the past history-based control, the electronic device 101 may reduce trial and error of the heat control and improve convenience that the user feels and the performance of the electronic device by releasing the heat state in a short time.

In operation 1007, the electronic device 101 according to various embodiments may control data throughput for each application according to the determination. For example, the electronic device 101 may control data throughput for each application according to the determined control level for each application in operation 1005. According to an embodiment, the electronic device 101 may configure the traffic control of the kernel 320 to achieve the determined data throughput. The electronic device 101 may control traffic according to the determined data throughput separately in uplink and downlink.

A method of operating an electronic device 101 or 201 (for example, the processor 210) according to various embodiments may include an operation of measuring temperature of the electronic device 101 or 201 through at least one sensor 140 or 240, an operation of identifying an operation state of at least one application being executed in the electronic device 101 or 201, and an operation of, when the measured temperature is higher than or equal to a reference value, controlling data throughput for each of the at least one application based on the operation state of the at least one application.

According to an embodiment, the operation state of the at least one application may include at least one factor among a resource use rate of the at least one application, operation in an FG or a BG, an accumulated amount of transmitted and received data, current consumption, and a type of an RAT which the electronic device is accessing.

According to an embodiment, the current consumption of the at least one application may be obtained on the basis of a number of packets per unit time generated by the at least one application and current consumption per unit time of the electronic device 101 or 201.

According to an embodiment, the operation of controlling the data throughput may include an operation of determining a data throughput control level for each of the at least one application based on the operation state of the at least one application, an operation of determining data throughput corresponding to the control level according to a data throughput policy, and an operation of controlling transmission and reception traffic for each of the at least one application according to the determined data throughput.

According to an embodiment, the data throughput policy may be information preset and stored in the electronic device 101 or 201 or periodically updated from an external device, and the measured state of the electronic device 101 or 201 may include at least one piece of information on a time point at which the electronic device 101 or 201 is used and information on a location at which the electronic device 101 or 201 is used.

The method of operating the electronic device 101 or 201 according to an embodiment may further include an operation of measuring a state of the electronic device 101 or 201 and an operation of determining the data throughput policy based on the measured state of the electronic device 101 or 201.

According to an embodiment, the operation of determining the data throughput corresponding to the control level may include an operation of determining the data throughput corresponding to the control level based on the determined data throughput policy.

The method of operating the electronic device 101 or 201 according to an embodiment may further include an operation of storing a data throughput control history for each of the at least one application and an operation of, when the temperature of the electronic device 101 or 201 is higher than or equal to the reference value, controlling data throughput for each of the applications, being executed, based on the stored data throughput control history.

The method of operating the electronic device 101 or 201 according to an embodiment may further include an operation of comparing the measured temperature with a reference value and an operation of determining a heat level of the electronic device 101 or 201, and the electronic device 101 or 201 may control, when the heat level is higher than or equal to a preset reference, data throughput for each of the at least one application based on the operation state of the at least one application.

Methods pertaining to claims or embodiments in the specifications may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more programs may include instructions for causing the electronic device to perform methods pertaining to claims and embodiments in the specifications.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), other type optical storage devices, or a magnetic cassette. Alternatively, the programs may be stored in a memory including any combination of some or all thereof. Further, the number of such memories may be plural.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. The storage device may access a device that performs embodiments of the disclosure through an external port. Further, a separate storage device in the communication network may access a device that performs embodiments of the disclosure.

In the concrete embodiments of the disclosure, elements included in the electronic device have been expressed as singular or plural according to presented concrete embodiments. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Meanwhile, although the concrete embodiments of the disclosure have been described in the detailed description of the disclosure, various modifications can be made without departing from the scope of the disclosure. Therefore, the scope of the disclosure should not be defined as being limited to the embodiments, but should be defined by the appended claims and equivalents thereof.

The invention claimed is:

1. A method of operating an electronic device, the method comprising:
    measuring a temperature of the electronic device through at least one sensor;
    identifying an operation state of at least one application being executed in the electronic device, including whether the at least one application is operating in a foreground state or a background state;
    detecting that the measured temperature is higher than or equal to a reference value; and
    based on the detection and the operation state of the at least one application, controlling data throughput for the at least one application by:
        determining a time period in which packets are generated, detecting a total electrical current consumption over the time period, detecting a portion of the time period in which the at least one application is radio active, estimating an electrical current consumption of the at least one application by multiplying the total electrical current consumption by the portion of the time period, and determining a future data throughput for the at least one application based on the estimated current consumption.

2. The method of claim 1, wherein the operation state of the at least one application further includes at least one factor among a resource use rate of the at least one application, an accumulated amount of transmitted and received data, and a type of a Radio Access Technology (RAT) which the electronic device is accessing.

3. The method of claim 1, wherein the controlling of the data throughput comprises:

determining a data throughput control level for the at least one application based on the operation state of the at least one application;

determining data throughput corresponding to the control level according to a data throughput policy; and controlling transmission and reception traffic for the at least one application according to the determined data throughput.

4. The method of claim 3, wherein the data throughput policy is information preset and stored in the electronic device or periodically updated from an external device.

5. The method of claim 4, further comprising:

measuring a state of the electronic device; and determining the data throughput policy based on the measured state of the electronic device.

6. The method of claim 5, wherein the determining of the data throughput corresponding to the control level comprises determining the data throughput corresponding to the control level based on the determined data throughput policy.

7. The method of claim 5, wherein the measured state of the electronic device includes at least one piece of information on a time point at which the electronic device is used and information on a location at which the electronic device is used.

8. The method of claim 1, further comprising:

storing a data throughput control history for the at least one application; and when the temperature of the electronic device is higher than or equal to the reference value, controlling data throughput for the applications, being executed, based on the stored data throughput control history.

9. The method of claim 1, wherein the controlling of the data throughput for the at least one application comprises:

comparing the measured temperature with a reference value;

determining a heat level of the electronic device; and when the heat level is higher than or equal to a preset reference, controlling data throughput for the at least one application based on the operation state of the at least one application.

10. An electronic device comprising:

at least one sensor used to measure temperature of the electronic device; and at least one processor configured to:

identify an operation state of at least one application being executed in the electronic device, including whether the at least one application is operating in a foreground state or a background state, detect that the measured temperature is higher than or equal to a reference value, and based on the detection and the operation state of the at least one application, control data throughput for the at least one application by:

determining a time period in which packets are generated, detecting a total electrical current consumption over the time period, detecting a portion of the time period in which the at least one application is radio active, estimating an electrical current consumption of the at least one application by multiplying the total electrical current consumption by the portion of the time period, and determining a future data throughput for the at least one application based on the estimated current consumption.

11. The electronic device of claim 10, wherein the operation state of the at least one application further includes at least one factor among a resource use rate of the at least one application, an accumulated amount of transmitted and received data, and a type of a Radio Access Technology (RAT) which the electronic device is accessing.

12. The electronic device of claim 10, wherein the at least one processor determines a data throughput control level for the at least one application based on the operation state of the at least one application, determines data throughput corresponding to the control level according to a data throughput policy, and controls transmission and reception traffic for the at least one application according to the determined data throughput.

13. The electronic device of claim 10, further comprising a memory configured to store a data throughput control history for the at least one application, wherein, when the temperature of the electronic device becomes the reference value or higher, the at least one processor controls data throughput for the applications, being executed, based on the stored data throughput control history.

14. The electronic device of claim 10, wherein the at least one processor compares the measured temperature with a reference value, determines a heat level of the electronic device, and controls data throughput for the at least one application based on the operation state of the at least one application when the heat level is higher than or equal to a preset reference.

* * * * *